(12) United States Patent
Föll

(10) Patent No.: US 9,397,843 B2
(45) Date of Patent: Jul. 19, 2016

(54) METHOD FOR CONFIGURING BILLING PROCESSES IN NETWORK ELEMENTS

(75) Inventor: Uwe Föll, Falkensee (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 2962 days.

(21) Appl. No.: 11/664,941

(22) PCT Filed: Oct. 8, 2004

(86) PCT No.: PCT/EP2004/011296
§ 371 (c)(1),
(2), (4) Date: Oct. 27, 2008

(87) PCT Pub. No.: WO2006/039934
PCT Pub. Date: Apr. 20, 2006

(65) Prior Publication Data
US 2009/0055298 A1 Feb. 26, 2009

(51) Int. Cl.
*G07B 17/00* (2006.01)
*G07F 19/00* (2006.01)
*H04L 12/14* (2006.01)
*G06Q 30/04* (2012.01)
*H04M 15/00* (2006.01)
*G06F 21/00* (2013.01)
*G06Q 20/00* (2012.01)

(52) U.S. Cl.
CPC ................ *H04L 12/14* (2013.01); *G06Q 30/04* (2013.01); *H04L 12/1403* (2013.01)

(58) Field of Classification Search
USPC ..................... 705/30, 34, 40, 52, 77
See application file for complete search history.

(56) References Cited

U.S. PATENT DOCUMENTS 6,697,103 B1 * 2/2004 Fernandez ....... G08B 13/19608
   348/143
6,952,836 B1 * 10/2005 Donlan ............... H04L 41/0806
   348/E7.069

(Continued)

OTHER PUBLICATIONS

Alban Couturier, "Signaling for QoS measurement", IETF Standard-Working-Draft, May 2003, pp. 1-19, abstract, chapters 1-3, 4.2-4.4, XP015000601, ISSN 0000-0004, Internet Engineering Task Force, IETF, Switzerland.

(Continued)

*Primary Examiner* — Ig T An
(74) *Attorney, Agent, or Firm* — Squire Patton Boggs (US) LLP

(57) ABSTRACT

A method configures billing processes in the network elements of data path for the transmission of packet data in a communications system. According to said method, network elements that are located between a first and a second element of the data path are configured and the packet data transmission that is associated with a terminal is carried out between the first network element and the second network element via the data path. The terminal transmits or receives the associated packet data transmission via the second network element. In a central third network element, which is not assigned to the data path, a stored billing control function generates a configuration message, which is used to configure the network elements. The configuration message is transmitted to the network elements of the data path, said network elements at least partially evaluating the configuration message for initialization and configuration purposes.

18 Claims, 1 Drawing Sheet

(56) References Cited

U.S. PATENT DOCUMENTS

| | | | | |
|---|---|---|---|---|
| 2002/0188562 A1* | 12/2002 | Igarashi | ............... | G06Q 20/102 705/40 |
| 2004/0025018 A1* | 2/2004 | Haas | ................ | H04L 45/26 713/168 |
| 2004/0090955 A1* | 5/2004 | Berthaud | ................ | H04L 45/00 370/386 |
| 2005/0039212 A1* | 2/2005 | Baran | ............... | H04L 29/06027 725/91 |
| 2007/0201702 A1* | 8/2007 | Hendricks | ............... | G06F 21/10 380/282 |
| 2007/0280235 A1* | 12/2007 | Chen | ................ | H04H 60/14 370/390 |
| 2008/0049623 A1* | 2/2008 | Qiu | ................ | H04L 12/2697 370/241 |
| 2008/0183641 A1* | 7/2008 | Tang | ................ | G06F 9/45537 705/418 |
| 2009/0319596 A1* | 12/2009 | Kumar | ................ | G06F 11/2033 709/202 |

OTHER PUBLICATIONS

F. Dressler et al., "NSLP for Accounting Configuration Signaling", www.watersprings.org/pub/id/draft-dressler-nsis-accounting-nslp-00.txt, Jul. 11, 2004, pp. 1-18, abstract, chapters 1-4.3, 5.3-7, XP002333853.

* cited by examiner

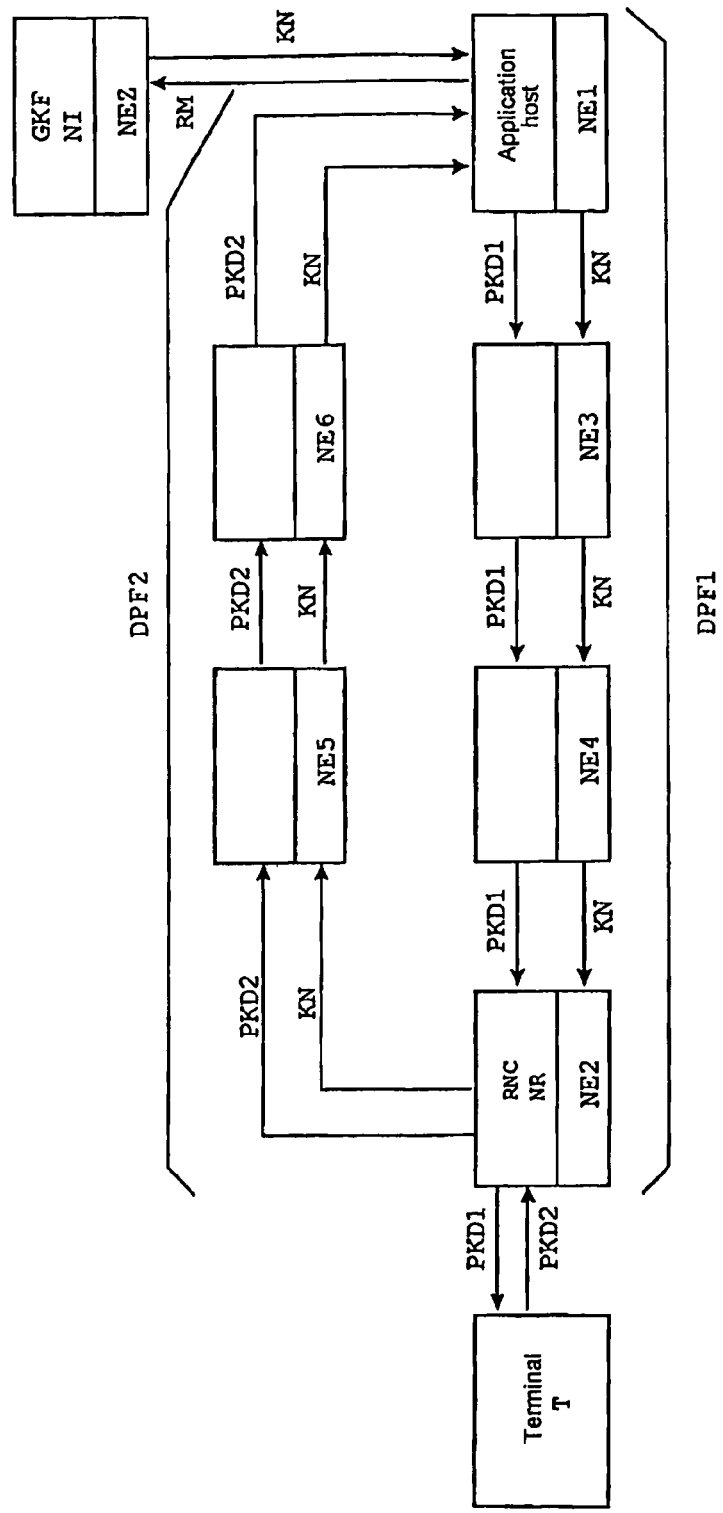

METHOD FOR CONFIGURING BILLING PROCESSES IN NETWORK ELEMENTS

CROSS REFERENCE TO RELATED APPLICATIONS

This application is based on and hereby claims priority to PCT Application No. PCT/EP2004/011296 filed on Oct. 8, 2004, the contents of which are hereby incorporated by reference.

BACKGROUND OF THE INVENTION

The invention relates to a method for configuring billing processes in network elements of a data path for the transmission of packet data in a communications.

Packet data services are known which use what is known as "IP Layer 3" of the "Open Systems Interconnection Reference, OSI" model within a communications network for example. This model serves as a reference model of the international Standards Organization ISO for networks in order to define an open communication using interface standards.

Billing data recording for a data service, for example for a packet data service, is based in this case on an independent and non-synchronized detection by network elements which are used to execute the data service. The network elements involved in the transmission of a data service in such cases each have assigned billing processes which are used for recording billing data. The billing data is collected in network elements provided especially for the purpose in order to create a service-oriented or service-specific billing.

The network elements involved in billing data recording have a unique correlation identifier to allow them identify all billing data pertaining to a concrete service usage.

The correlation identifier is entered in the billing data so that billing data can be linked together by a central entity and processed together for billing.

A central problem of this type of billing is the distribution of the unique correlation identifier to the respective network elements. The network elements involved in executing a service generally operate on different network layers, for example on layers of the OSI model—Layer 2, Layer 3 or Layer 7.

Additional problems during billing data recording are caused if the network elements are arranged in different areas of the network, for example if they are arranged in a "Packet Switched, PS" domain or in an "IP Multimedia Subsystem, IMS".

Furthermore it is possible for the network elements involved in the execution of a packet data service to be separated from each other by technology boundaries. Thus for example some of the network elements can be based on the "Universal Mobile Telecommunication system, UMTS" whereas others can be based on the "Wireless Local Area Network, WLAN".

In these outlined cases a mechanism for distribution of the respective correlation identifier must be defined and standardized, which means that rapid introduction of new services involves great expense. Thus for example the known "Multi Media Service, MMS" for prepaid subscribers has for a long time not been able to be provided because the required billing data recording methods are not offered. The method for distribution of the correlation identifiers for billing data recording are thus only able to be implemented at great expense, since billing data is collected in the network elements involved and resulting billing data records must be forwarded to a central entity. The central entity for its part must determine from an incoming flood of data those billing data records which belong together, and needs a great deal of time to evaluate them.

Methods for billing data recording or methods for configuration of billing processes at the network elements involved are discussed for example by the "Internet Engineering Task Force, IETF" within the framework of the project "Next Steps in Signaling, NSIS", in which case underlying Internet routing methods are used to find network elements of a data path.

SUMMARY

One possible object of the present invention is to implement a simple and quick-to-execute method for configuration of billing processes at network elements, to enable billing data to be recorded for a packet data service in a communications network.

The inventor recognized that different routes or data paths are used for the packet data transmission for the routing which is typically to be executed asymmetrically for a packet data service. In general the packet data is transmitted between a terminal, for example a radio communication terminal on one side, and an application host on the other side, in two directions, and thereby over two data paths.

Since the current routing methods can only address the respective network element of a data path in one direction, a configuration for billing data recording is not possible from the network element side between the two end points—terminal on one side and application host on the other side. Configuration from the terminal side is excluded for reasons of security. A configuration by the application host is not able to be easily implemented for reasons of cost and time.

These problems are avoided in the proposed method. In accordance with the proposed method, a billing control function which is held in a central network element is used for configuring the network elements of a data path. In such cases this central network element is not a component of the data path, i.e. the packet data transmission in question is not undertaken via the central network element.

The billing control function forms a configuration message for configuration of the network elements and is started for example when a service is requested. The configuration message is transmitted via the application host as the first network element to the network element of the data path to be configured. Those network elements which are to be configured evaluate the configuration message for an initialization, whereas other network elements of the data path forward the configuration message.

The "Network Link Services Protocol, NLSP", known per se, is preferably, but not exclusively used with the communications network to transmit the configuration message together with further signaling messages to the network elements.

Not the terminal but an upstream network element assigned to the terminal is used as the ingress node for the data path. Accordingly the configuration message is formed by the central network element and not by the application host used as a further ingress node for the data path. These measures guarantee both the security of the billing data recording and also the high processing speed of the application host.

A central billing control function is implemented with the aid of the method for storage of configuration rules.

BRIEF DESCRIPTION OF THE DRAWINGS

These and other objects and advantages of the present invention will become more apparent and more readily appre- FIG. 1 shows a method with reference to a communications network, in accordance with one possible embodiment of the invention.

In this diagram the communications network features network elements NE1 to NE6, a central network element NEZ and a terminal T, with a first network element NE1 being embodied as an application host and a second network element NE2 as a Radio Network Controller RNC.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

A billing control function GKF is stored or implemented on the central network element NEZ. For a requested packet data transmission PKD1, PKD2 between the first network element NE1 and the terminal T which is undertaken via the second network element NE2, a configuration message KN is formed by the billing control function GKF, which is used for configuration of the network elements NE3, NE4, NE5 and NE6. The configuration message KN is transmitted to network element NEx of a first data path DPF1, with the first data path DPF1 including network elements NE1, NE3, NE4 and NE2.

An assigned first packet data transmission PKD1 is undertaken along the first data path DPF1 from first network element NE1 via the network elements NE3 and NE4 and via the second network element NE2 to terminal T, with terminal T being assigned to the second network element NE2.

The configuration message KN uses an IP address or a port address of the terminal T as its destination address, which also defines the first packet data transmission PKD1 from the first network element NE1 to terminal T.

A receive function is implemented on the second network element NE2 which makes it possible to send back the configuration message KN from the second network element NE2 to the first network element NE1 via a further second data path DPF2 within the framework of a second packet data transmission PKD2.

The configuration message KN is transmitted to network element NEx of the second data path DPF2, with the second data path DPF2 including the network elements NE2, NE5, NE6 and NE2.

For this purpose the configuration message KN is assigned by the terminal an IP address or port address of the first network element NE1, with which the second packet data transmission PKD2 from terminal T via the second network element NE2 and via the second data path DPF2 to the first network element NE1 is defined.

The second packet data transmission PKD2 is undertaken along the second data path DPF2 from terminal T via the second network element NE2 and the network elements NE5 and NE6 to the first network element NE1.

In the case depicted here, the network elements NE3 to NE6 receive the respective configuration message KN and evaluate this for initialization and configuration. However in such cases it is also possible for a few network elements—not shown here—to simply forward the configuration message KN.

Subsequently collected billing data RM is notified back to the central network element NEZ.

For the case of a number of parallel transmissions, known as sessions, between the first network element NE1 embodied as an application on the one side and the terminal T on the other side, the respective data paths are defined using a number of what are referred to as session identities.

Advantageously the protocol NLSP is used for transmission of the configuration message KN. In this case, in accordance with the NSIS terminology, the Radio Network Controller RNC forms an NSIS Receiver NR and the central network element NEZ an NSIS Initiator NI.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for configuring billing processes in network elements of a radio communications system, the radio communications system including at least a first network element, a second network element, a first data path extending between the first network element and the second network element including at least one first intermediate network element, a second data path extending between the first network element and the second network element including at least one second intermediate network element not common with the first intermediate network element, a terminal assigned to the second network element, and a central network element, the method comprising:

transmitting, from the central network element to the first network element, a configuration message from a billing control function implemented in the central network element;

after receiving the configuration message at the first network element, transmitting the configuration message from the first network element to the terminal through the first data path;

transmitting the configuration message from the terminal to the first network element through the second data path;

configuring and initializing billing processes at one or more of the at least one first intermediate network element and the at least one second intermediate network element based on the configuration message; and transmitting billing data collected at the first network element based on the configured and initialized billing processes to the billing control function implemented in the central network element, the central network element not being located along either the first data path or the second data path.

2. The method as claimed in claim 1, wherein
    the configuration message uses an IP address or port address of the terminal as a destination address for the configuration message, and
    the IP address or port address of the terminal is used to define packet data transmission from the first network element to the terminal.

3. The method as claimed in claim 1, wherein
    the terminal assigns to the configuration message an IP address or port address of the first network element as a destination address for the configuration message, and
    the IP address or port address of the first network element is used to define packet data transmission of the configuration message from the terminal to the second network element via the first data path and from the second network element to the first network element via the second data path.

4. The method as claimed in claim 3, wherein the at least one second intermediate network element at least partly evaluates the configuration message for initialization and configuration of the billing processes.

5. The method as claimed in claim 1, wherein the configuration message is transmitted using an NLSP protocol.

6. The method as claimed in claim 1, wherein the first network element is an application host.

7. The method as claimed in claim 1, wherein the terminal is a radio communication terminal of the radio communication system.

8. The method as claimed in claim 7, wherein the second network element is a control device of the radio communication system.

9. The method as claimed in claim 8, wherein the control device is a Radio Network Controller of the radio communications system.

10. The method as claimed in claim 2, wherein the terminal assigns to the configuration message an IP address or port address of the first network element as a destination address for the configuration message, and the IP address or port address of the first network element is used to define packet data transmission of the configuration message from the terminal to the second network element via the first data path and from the second network element to the first network element via the second data path.

11. The method as claimed in claim 10, wherein the at least one second intermediate network element at least partly evaluates the configuration message for initialization and configuration of the billing processes.

12. The method as claimed in claim 11, wherein the configuration message is transmitted using an NLSP protocol.

13. The method as claimed in claim 12, wherein the first network element is an application host.

14. The method as claimed in claim 13, wherein the terminal is a radio communication terminal of the radio communication system.

15. The method as claimed in claim 14, wherein the second network element is a control device of the radio communication system.

16. The method as claimed in claim 15, wherein the control device is a Radio Network Controller of the radio communications system.

17. The method as claimed in claim 1, wherein the configuration message is transmitted from the first network element to the terminal through the first data path within the framework of a first packet data transmission.

18. The method as claimed in claim 17, wherein the configuration message is transmitted from the terminal to the first network element through the second data path within the framework of a second packet data transmission.

* * * * *